US009686911B2

(12) United States Patent
Stoffel et al.

(10) Patent No.: US 9,686,911 B2
(45) Date of Patent: Jun. 27, 2017

(54) CUTTING BLADE WITH TRANSVERSE HARDENED REGIONS

(71) Applicants: Neal J. Stoffel, Campbellsport, WI (US); Keith A. Johnson, Kewaskum, WI (US)

(72) Inventors: Neal J. Stoffel, Campbellsport, WI (US); Keith A. Johnson, Kewaskum, WI (US)

(73) Assignee: Kondex Corporation, Lomira, WI (US)

( * ) Notice: Subject to any disclaimer, the term of this patent is extended or adjusted under 35 U.S.C. 154(b) by 60 days.

(21) Appl. No.: 14/708,649

(22) Filed: May 11, 2015

(65) Prior Publication Data
US 2015/0319923 A1 Nov. 12, 2015

Related U.S. Application Data

(60) Provisional application No. 61/991,938, filed on May 12, 2014, provisional application No. 62/036,490, (Continued)

(51) Int. Cl.
*A01D 34/73* (2006.01)
*A01D 34/66* (2006.01)
(Continued)

(52) U.S. Cl.
CPC ......... *A01D 34/736* (2013.01); *A01D 34/661* (2013.01); *A01D 34/73* (2013.01);
(Continued)

(58) Field of Classification Search
CPC .... A01D 34/01; A01D 34/015; A01D 34/412; A01D 34/664; A01D 34/73; B23D 61/025; B23K 21/00
(Continued)

(56) References Cited

U.S. PATENT DOCUMENTS 2,608,111 A * 8/1952 Ratkowski .............. E02F 9/285
37/460
3,063,310 A 11/1962 Connoy
(Continued)

FOREIGN PATENT DOCUMENTS

EP 0462484 A2 12/1991
EP 2 200 914 3/2009
(Continued)

OTHER PUBLICATIONS

Harvesting Equipment—Blades for Agricultural Rotary Mowers—Requirements; International Standard ISO 5718; Jul. 15, 2002; 10 pages; First edition; Geneva, Switzerland.
(Continued)

*Primary Examiner* — John G Weiss
(74) *Attorney, Agent, or Firm* — Reinhart Boerner Van Deuren P.C.

(57) ABSTRACT

A blade for a mower disc body is provided. The blade includes a cutting blade body of a first base material, top and bottom surfaces and an outer surface that extends around the cutting blade body vertically between the top and bottom surfaces. The blade further includes a cutting edge formed along the outer surface and a plurality of clad beads extending along one of the top and bottom surfaces transversely away from the non-serrated cutting edge.

35 Claims, 8 Drawing Sheets

Related U.S. Application Data filed on Aug. 12, 2014, provisional application No. 62/081,897, filed on Nov. 19, 2014.

(51) Int. Cl.
  *B23K 20/00* (2006.01)
  *A01D 101/00* (2006.01)

(52) U.S. Cl.
  CPC ............ *A01D 34/733* (2013.01); *B23K 20/00* (2013.01); *A01D 2101/00* (2013.01)

(58) Field of Classification Search
  USPC ........................ 56/295, 289; 83/663; 76/115
  See application file for complete search history.

(56) References Cited

U.S. PATENT DOCUMENTS

| | | | |
|---|---|---|---|
| 3,859,865 A | 1/1975 | Conrad | |
| 3,937,317 A | 2/1976 | Fleury, Jr. | |
| 3,944,443 A | 3/1976 | Jones | |
| 3,975,891 A * | 8/1976 | Gunther | A01D 34/73 30/350 |
| 4,416,656 A | 11/1983 | Shapiro | |
| 4,451,302 A | 5/1984 | Prescott et al. | |
| 4,466,533 A | 8/1984 | Shwayder | |
| 4,516,302 A | 5/1985 | Chulada et al. | |
| 4,530,204 A | 7/1985 | Brooks | |
| 4,645,404 A | 2/1987 | Juravic | |
| 4,660,361 A | 4/1987 | Remillard et al. | |
| 4,666,033 A | 5/1987 | Reid | |
| 4,842,126 A | 6/1989 | McConnell | |
| 4,909,026 A | 3/1990 | Molzahn et al. | |
| 4,949,836 A | 8/1990 | Schostek | |
| 5,016,747 A | 5/1991 | Veenhof | |
| 5,092,453 A | 3/1992 | Bruke | |
| 5,181,461 A | 1/1993 | Viaud | |
| 5,209,053 A | 5/1993 | Verbeek | |
| 5,213,202 A | 5/1993 | Arnold | |
| 5,444,969 A | 8/1995 | Wagstaff et al. | |
| 5,673,618 A | 10/1997 | Little | |
| 5,823,449 A | 10/1998 | Kooima et al. | |
| 6,089,334 A | 7/2000 | Watts | |
| 6,155,705 A | 12/2000 | Douris et al. | |
| 6,402,438 B1 | 6/2002 | Boyer | |
| 6,543,211 B1 | 4/2003 | Talbot | |
| 6,594,975 B2 | 7/2003 | Anstey et al. | |
| 6,857,255 B1 | 2/2005 | Wilkey et al. | |
| 6,962,040 B2 | 11/2005 | Talbot | |
| 7,478,522 B1 | 1/2009 | Lovett et al. | |
| 7,677,843 B2 | 3/2010 | Techel et al. | |
| 7,827,883 B1 | 11/2010 | Cherng et al. | |
| 8,096,221 B2 * | 1/2012 | Tarrerias | B23D 65/00 76/104.1 |
| 8,353,148 B2 | 1/2013 | Derscheid | |
| 8,464,506 B2 | 6/2013 | Schumacher et al. | |
| 8,484,938 B2 | 7/2013 | Cormier et al. | |
| 8,579,774 B2 | 11/2013 | Derscheid | |
| 8,662,131 B2 | 3/2014 | Cormier et al. | |
| 8,662,132 B2 | 3/2014 | Cormier et al. | |
| 8,714,053 B2 * | 5/2014 | Krauter | B22F 7/062 219/54 |
| 2002/0131328 A1 | 9/2002 | Bowens et al. | |
| 2003/0066391 A1 | 4/2003 | Griffo et al. | |
| 2003/0101706 A1 * | 6/2003 | Kenny | A01D 34/005 56/255 |
| 2005/0241440 A1 | 11/2005 | Beck | |
| 2007/0163128 A1 | 7/2007 | Tarrerias | |
| 2007/0261867 A1 | 11/2007 | Techel et al. | |
| 2008/0006016 A1 | 1/2008 | Snider et al. | |
| 2008/0078656 A1 | 4/2008 | Rhodea et al. | |
| 2009/0095214 A1 | 4/2009 | Whitfield | |
| 2009/0322143 A1 | 12/2009 | Krauter | |
| 2011/0009251 A1 | 1/2011 | Derscheid | |
| 2011/0067374 A1 | 3/2011 | James et al. | |
| 2012/0060379 A1 | 3/2012 | Culf | |
| 2012/0063871 A1 | 3/2012 | Wood | |
| 2012/0233974 A1 | 9/2012 | Cormier et al. | |
| 2013/0032047 A1 | 2/2013 | Marques et al. | |
| 2013/0111863 A1 | 5/2013 | Johnson et al. | |
| 2013/0233145 A1 * | 9/2013 | Sotelo | B21K 11/00 83/835 |
| 2014/0041537 A1 | 2/2014 | Hubach et al. | |
| 2014/0045562 A1 * | 2/2014 | Adamczyk | A01F 29/02 460/112 |
| 2014/0215787 A1 * | 8/2014 | Wada | B23P 6/00 29/402.18 |
| 2014/0230394 A1 * | 8/2014 | Zerbarini | A01D 34/52 56/16.7 |
| 2015/0319922 A1 * | 11/2015 | Stoffel | A01D 34/664 56/14.7 |
| 2016/0157423 A1 * | 6/2016 | Stoffel | A01F 29/09 148/525 |

FOREIGN PATENT DOCUMENTS

| | | |
|---|---|---|
| EP | 2 371 205 A1 | 10/2011 |
| EP | 2 499 896 A1 | 9/2012 |
| JP | 7-24986 | 6/1995 |
| JP | 2006020531 A | 1/2006 |
| JP | 2009011223 A | 1/2009 |
| JP | 2009126608 A | 6/2009 |

OTHER PUBLICATIONS

Hyungson Ki et al.; Process map for laser heat treatment of carbon steels; Optics & Laser Technology; 2012, 9 pages (2106-2114) vol. 44.

Sangwoo So et al.; Effect of specimen thickness on heat treatability in laser transformation hardening; International Journal of Heat and Mass Transfer; 2013; 11 pages (266-276); vol. 61.

U.S. Appl. No. 14/708,466, filed May 11, 2015, Stoffel et al.

* cited by examiner

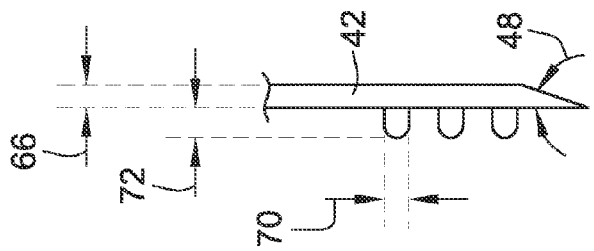
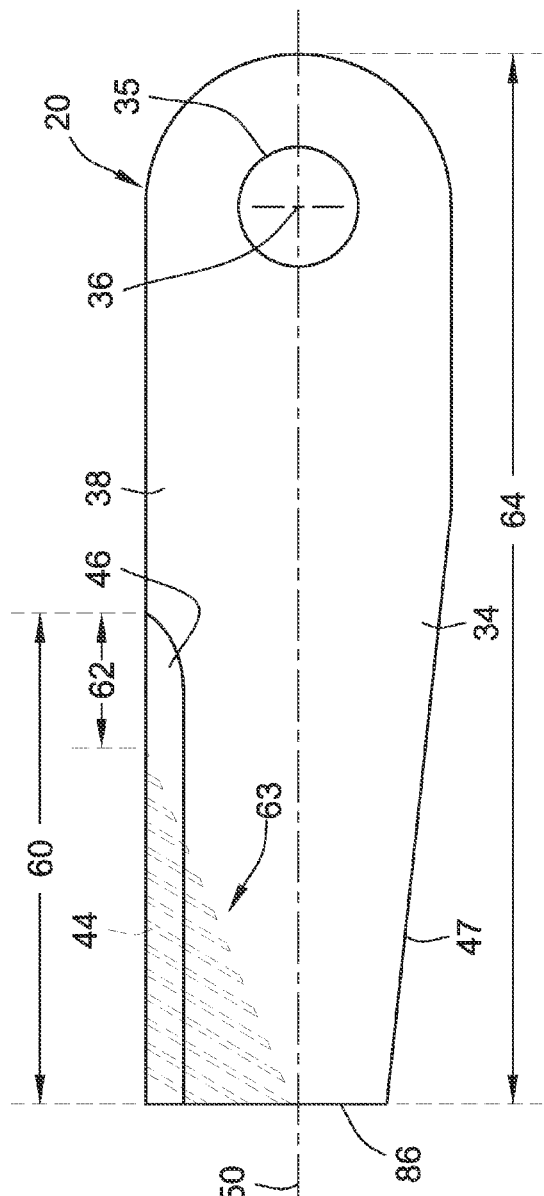
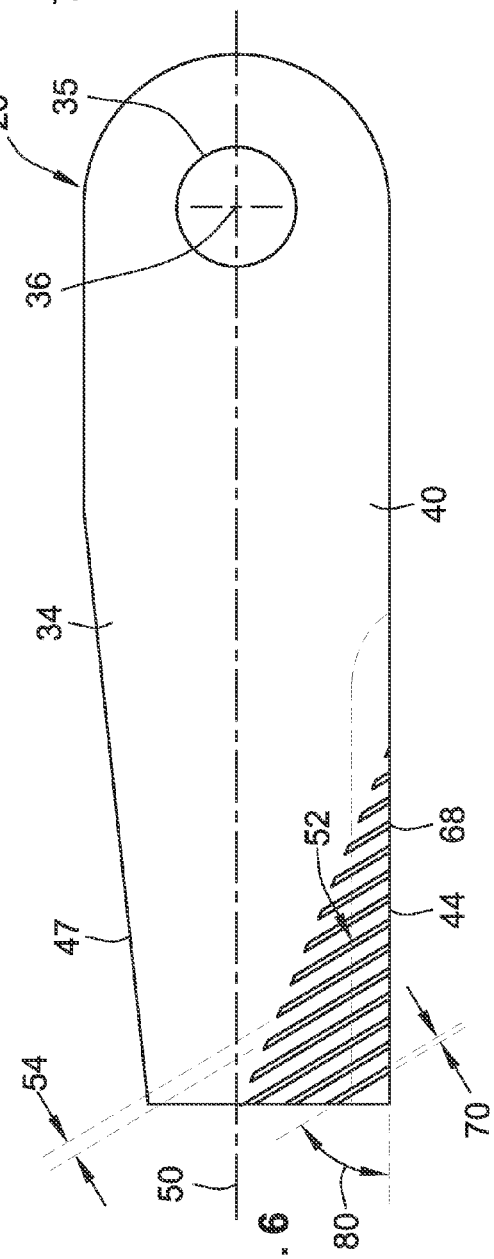

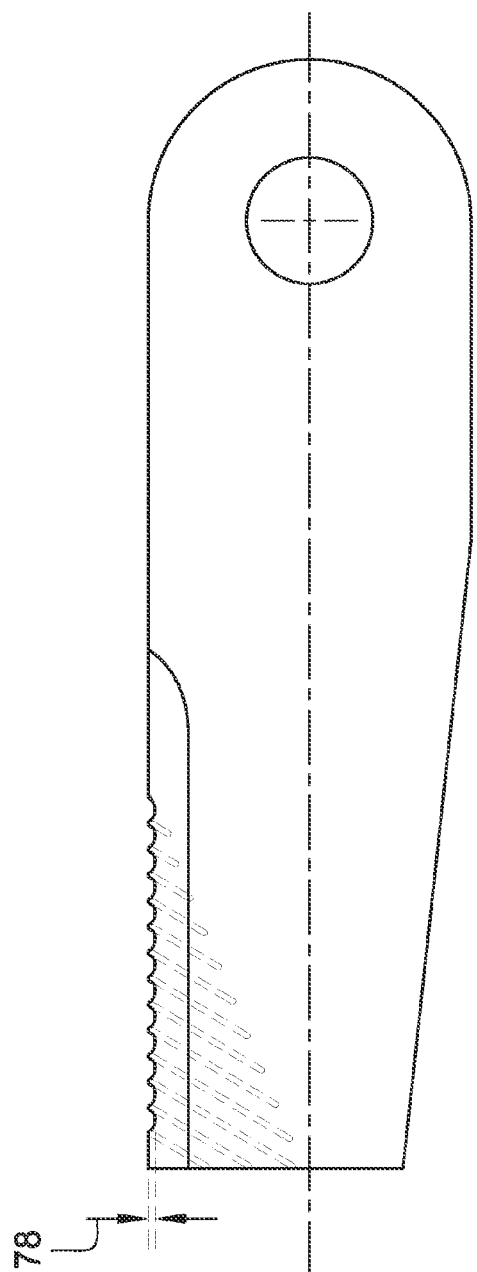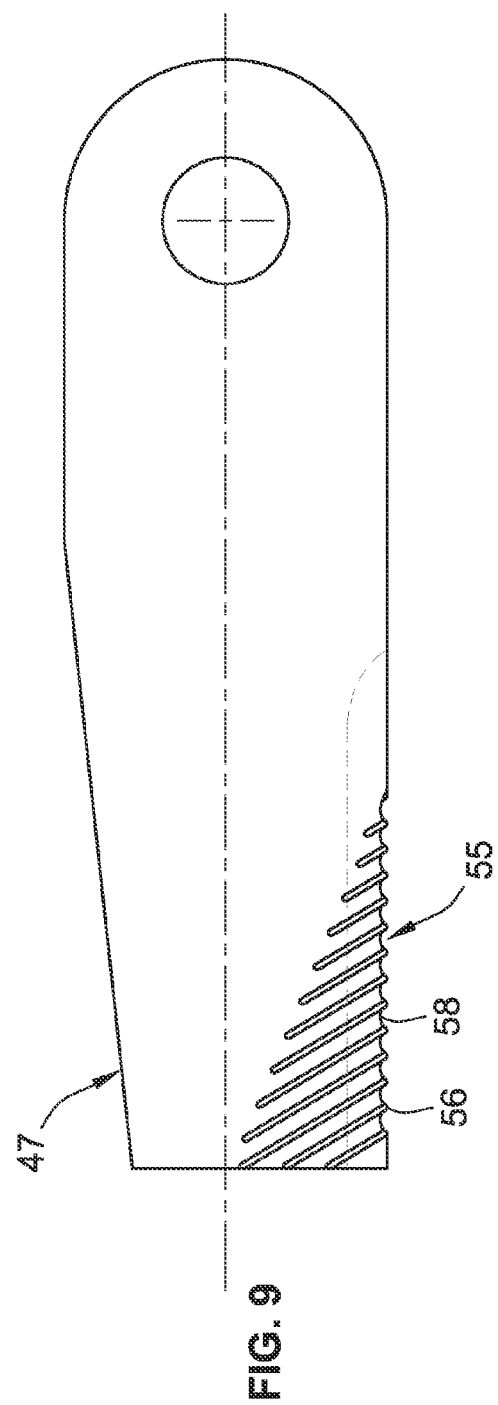

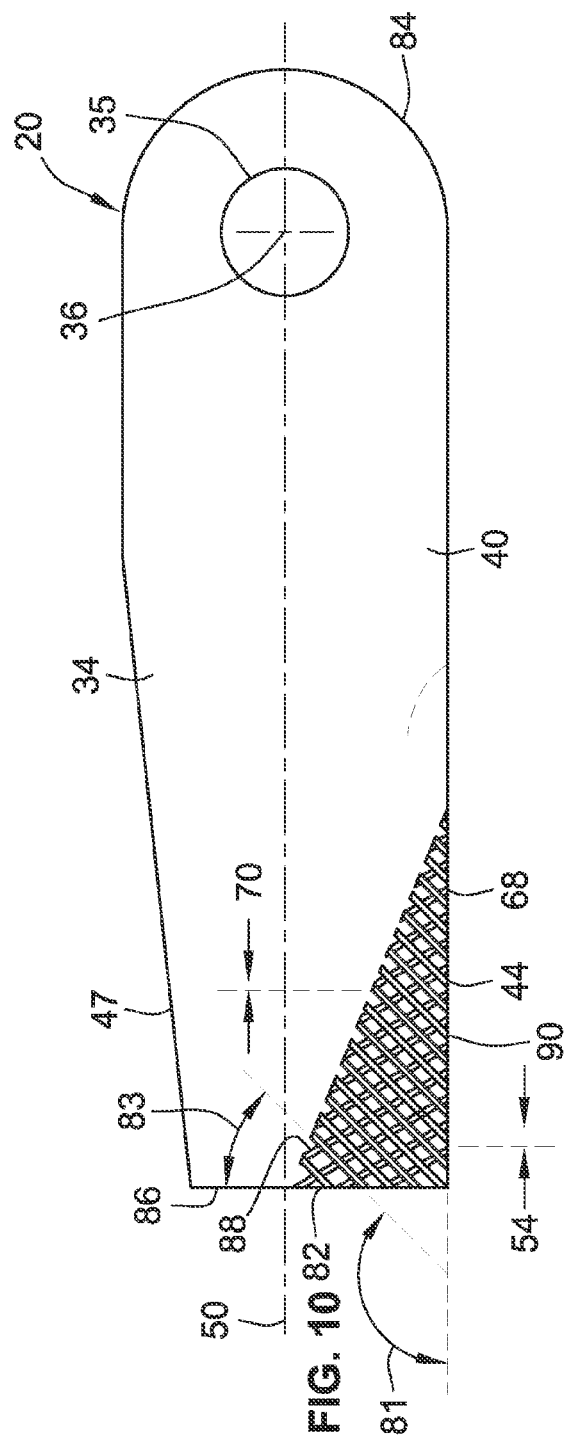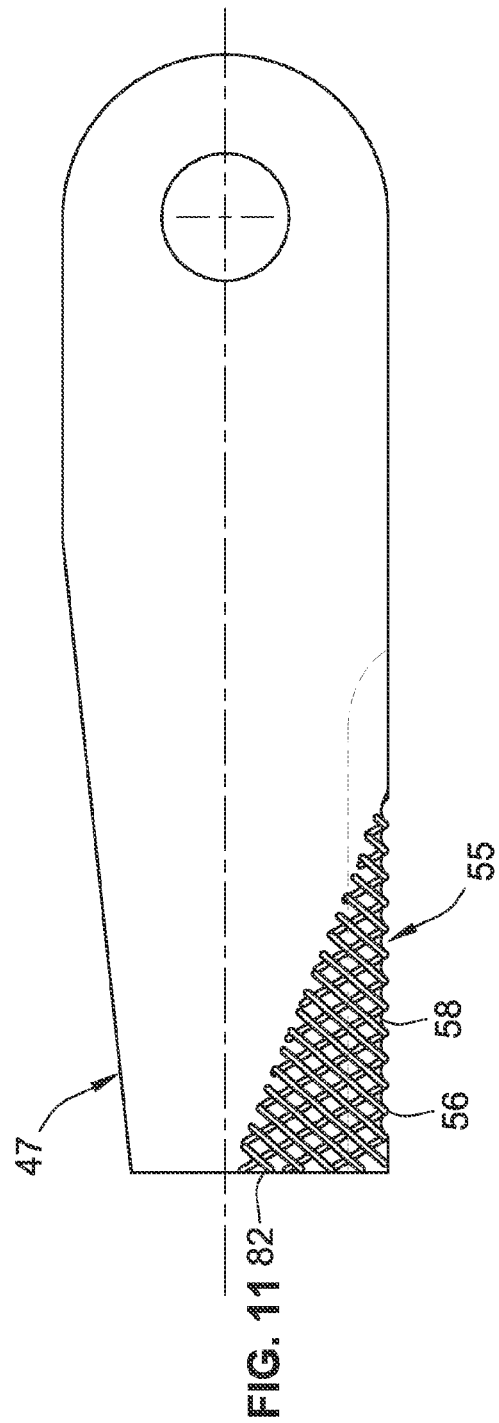

CUTTING BLADE WITH TRANSVERSE HARDENED REGIONS

This patent application claims the benefit of U.S. Provisional Patent Application No. 61/991,938, filed May 12, 2014, U.S. Provisional Patent Application No. 62/036,490, filed Aug. 12, 2014, and U.S. Provisional Patent Application No. 62/081,897, filed Nov. 19, 2014, the entire teachings and disclosure of which are incorporated herein by reference thereto.

FIELD OF THE INVENTION

This invention generally relates to mower disc blades (also referred to as knives).

BACKGROUND OF THE INVENTION

Disc mowing machines are utilized to cut a crop while moving through a stand of the crop. Examples of such machines are shown for example in U.S. Patent Application Publication No. 2013/0111863. The disc mowing machines may be either self-propelled or pulled, for example, by a tractor.

As disclosed in the '863 publication, current disc mowing machines cut agricultural material using a severing blade that is rectangular in shape with a mounting hole toward one end of the blade. The severing blade is rotatably mounted to a plurality of rotating mower discs. The portion of the blade away from the mounting portion has a beveled edge and this portion of the blade impacts and cuts the crop as the disc rotates.

There are problems associated with current disc mower machines. They require a large amount of power to rotate their discs and drive the rectangular blades through the crops. The cutting of the crop itself is not a large percentage of the total power required, but any reduction in power used is beneficial. Ideally, if the crop can be cut more efficiently, the amount of fuel used can be reduced.

The rectangular blades of current designs become dull almost immediately upon use and impact with the crop. The blades wear out beyond usefulness in a fairly short time span depending on field conditions. Such wear leads to increased expenses and increase time for maintenance to repair and or replace the worn blades.

Efforts to improve these blades have been attempted by providing a serrated cutting edge with hardened laser clad beads forming the serrated cutting edge. For example, this type of solution has been attempted as described in U.S. Pat. No. 7,677,843, the entire teachings of which are incorporated herein by reference as the materials and techniques disclosed there can also be applied to the present invention.

However, various drawbacks and inefficiencies exist in the approach of the '843 patent, as will become apparent with the various inventive aspects of the present invention and disclosure and claims herein that so distinguish.

BRIEF SUMMARY OF THE INVENTION

In one aspect, the invention provides a cutting blade for vegetation that includes a cutting blade body that may be comprised of a first base material. The cutting blade body has top and bottom surfaces, an outer surface extending around the cutting blade body vertically between the top and bottom surfaces, and a cutting edge formed along the outer surface. The cutting blade body also has a plurality of clad beads extending along one of the top and bottom surfaces. The clad beads extend transversely away from the cutting edge and the cutting edge is non-serrated.

In another aspect, the invention provides a cutting blade for a mower disc body. The blade may include a cutting blade body that comprises a base material of a first hardness. The blade body may have opposed top and bottom surfaces and an outer surface that extends around the blade body vertically between the top and bottom surfaces. The blade may include a cutting blade body mounting aperture that extends through the top and bottom surfaces. The cutting blade body may further include a cutting face that extends obliquely between the top surface toward the bottom surface and a cutting edge that is formed at a leading edge of the cutting face. One of the top and bottom surfaces of the cutting blade body may include a plurality of hardened beads that are spaced apart and of a second hardness greater than the first hardness. The hardened beads may be arranged at or adjacent to the cutting edge and lateral gaps may be formed of the base material between adjacent hardened beads.

In still another aspect, the invention comprises a method for providing a cutting blade with a cutting blade body. The cutting blade body may have a top surface and a bottom surface. The cutting blade body may be formed of a base material and have a cutting edge formed into the cutting blade body. The cutting edge may extend along an outer edge of the cutting blade body. The method further comprises cladding a plurality of beads that are laterally spaced apart along one of the top and bottom surfaces so that the beads extend from the cutting edge towards a central longitudinal axis of the cutting blade body while leaving exposed regions of the base material between adjacent laterally spaced beads.

In an embodiment, the cutting edge along a ground face is formed by the first base material in an unused condition. The cutting blade is configured so that the plurality of clad beads are at the cutting edge in the unused condition are sufficiently adjacent to the cutting edge such that the plurality of clad beads become part of the cutting edge over time during use.

In an embodiment, the first base material may be of a first hardness having a first wear rate with use, and wherein the plurality of clad beads may be of a second material of a second hardness having a second wear rate with use.

In an embodiment, the first hardness may be less than the second hardness and the first wear rate of the first material may be greater than the second wear rate of the second material. The plurality of clad beads may be laser clad beads deposited on one of the top and bottom surfaces.

In an embodiment, each one of the plurality of clad beads may be spaced laterally from another one of the plurality of clad beads with uncladded regions therebetween such that the base material between the clad beads of the second material wears faster during use and results in a wave pattern in the cutting edge.

In an embodiment, no part of the clad beads, other than flash, extends forward of the cutting edge in the unused condition. A leading end of the clad beads may be between 0 mm and 5 mm of the cutting edge.

In an embodiment, the cutting blade includes a clad bead application region. The clad beads may occupy 20% to 80% of the clad bead application region. Free regions of first base material exposed between the clad beads may include 20% to 80% of the clad bead application region.

In an embodiment, the space between each one of the plurality of clad beads adjacent to the cutting edge is between 5 mm and 20 mm to control the depth of the wave pattern during wear.

In an embodiment, each one of the plurality of clad beads may extend transversely away from the cutting edge towards a central longitudinal axis of the cutting blade body at an angle in the range of 45° to 55° relative to the cutting edge.

In an embodiment, the cutting edge is configured to form a wave pattern only after use.

In an embodiment, the plurality of hardened beads may be deposited along the cutting edge and thereby form part of the cutting edge of the cutting face, are not machined prior to use and may not extend beyond an outermost perimeter of the blade body prior to use, other than flash. The plurality of hardened beads may extend beyond an outermost periphery of the blade body to form part of a wave pattern along the cutting edge only after use.

In an embodiment, the cutting edge is composed of discrete cutting edge segments. Each cutting edge segment may be comprised of at least one unsharpened hardened bead and a length of base material.

In an embodiment, at least 20 percent of the cutting edge may be comprised of the base material before and after use.

In an embodiment, a mower disc assembly is provided for. The mower disc assembly comprises at least two cutter blades. The cutter blade includes a cutting blade body that may be comprised of a first base material. The cutting blade body has top and bottom surfaces, an outer surface extending around the cutting blade body vertically between the top and bottom surfaces, and a cutting edge formed along the outer surface. The cutting blade body also has a plurality of clad beads extending along one of the top and bottom surfaces. The clad beads extend transversely away from the cutting edge and the cutting edge is non-serrated. The mower disc assembly may comprise a mower disc body adapted to rotate about a central axis of the mower disc body.

Each cutting blade may be mounted to the disc mower body in space relation. Each cutting blade may have a leading face and a trailing face. The cutting edge may be along the leading face. The plurality of clad beads may extend from the leading face at or adjacent the cutting edge towards the trailing face.

In an embodiment, the step of cladding may further comprise the step of depositing each bead of cladding transversely away from the cutting edge towards a cutting blade body central longitudinal axis at an angle in the range of 45° to 55° relative to the cutting edge.

In an embodiment, the step of providing the cutting blade with the cutting blade body may include providing the top and bottom surfaces in opposed space relation and a cutting face that extends from the cutting edge towards a one of the top and bottom surfaces.

In an embodiment, the step of cladding is done only after the cutting face is formed.

In an embodiment, the step of cladding is done by laser cladding.

In an embodiment, the method includes providing the base material that may be of a first hardness and cladding that may be of a second material and of a second hardness. The first hardness may be less than the second hardness such that during use the base material wears faster than the second material so as to form a wave pattern in the cutting edge.

In an embodiment, the plurality of clad beads include a first plurality of clad beads and a second plurality of clad beads. The first plurality of clad beads may be aligned differently than the second plurality of clad beads.

In an embodiment, the first and second plurality of clad beads overlap in a crisscross pattern.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a top view of a blade employed in the mower disc assembly of FIG. 4;

FIG. 6 is a bottom view of the blade of FIG. 5;

FIG. 7 is a side view of the blade of FIG. 5;

FIG. 8 is a top view of the blade of FIG. 5 after use;

FIG. 9 is a bottom view of the blade of FIG. 5 after use;

FIG. 10 is a bottom view of an embodiment of a blade employed in the mower disc assembly of FIG. 4;

FIG. 11 is a bottom view of the blade of FIG. 10 after use;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
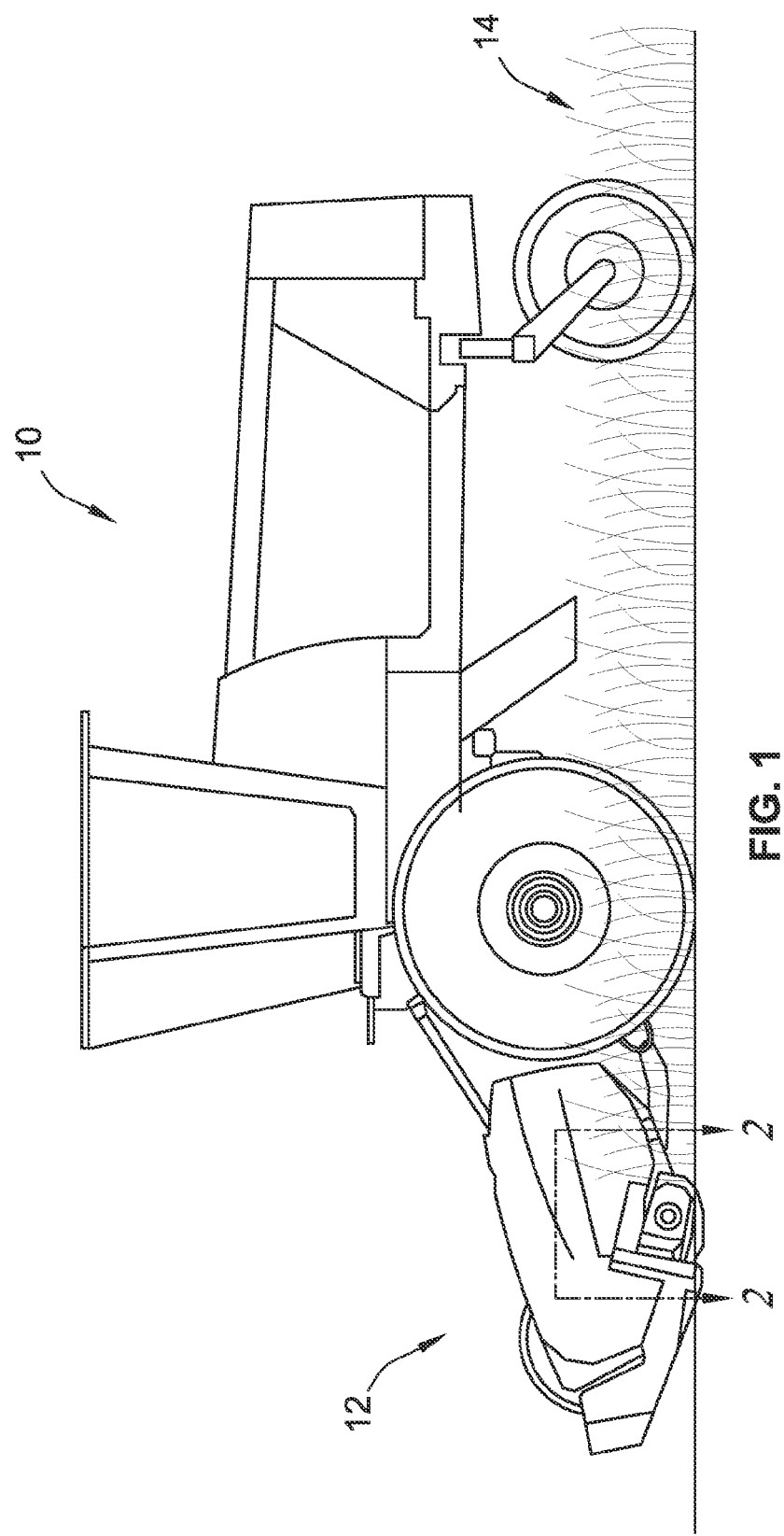
FIG. 1 is an illustration of a tractor manipulating a mowing machine through a crop.

FIG. 1 illustrates a tractor 10 operating a mowing machine 12 through a stand of crop 14. The mowing machine 12 may either be self-propelled or as shown here manipulated and powered by the tractor 10.

Figure 2:
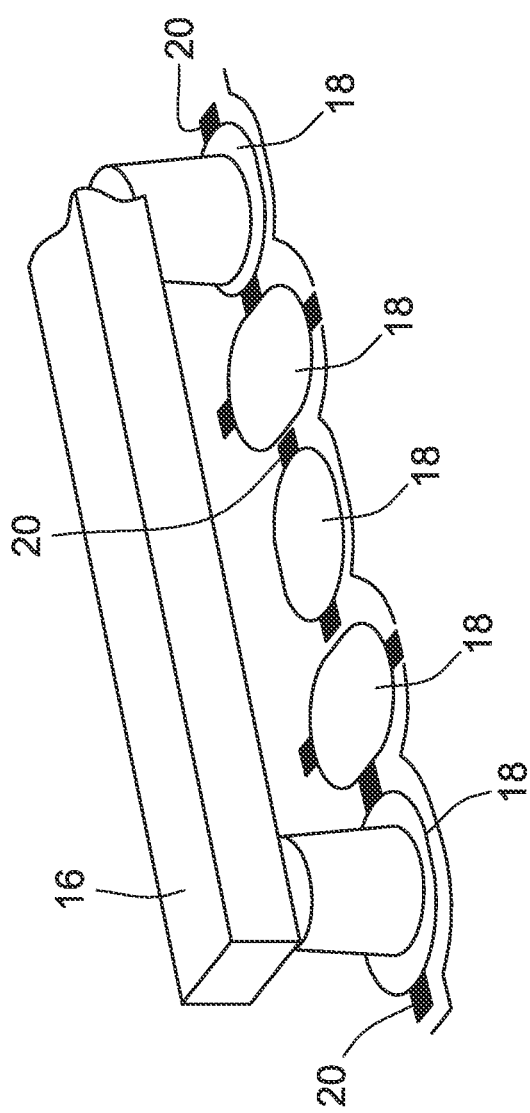
FIG. 2 is a partly schematic isometric illustration of a disc mower cutter bar including a plurality of discs holding a plurality of mower blades.

FIG. 2 illustrates a mower disc cutter bar 16 that forms a part of the mowing machine 12 shown in FIG. 1. The mower disc cutter bar 16 supports a plurality of mower disc assemblies 18, which in turn support a plurality of mower blades 20 (also known as cutter blades and/or knives). The blades 20 described herein may be used in various applications such as cutting vegetation including lawn and turf applications, cutting crops, and various other agricultural operations for which blade 20 is well suited. Accordingly, the aforementioned uses for blade 20 are intended as non-limiting examples.

Figure 3:
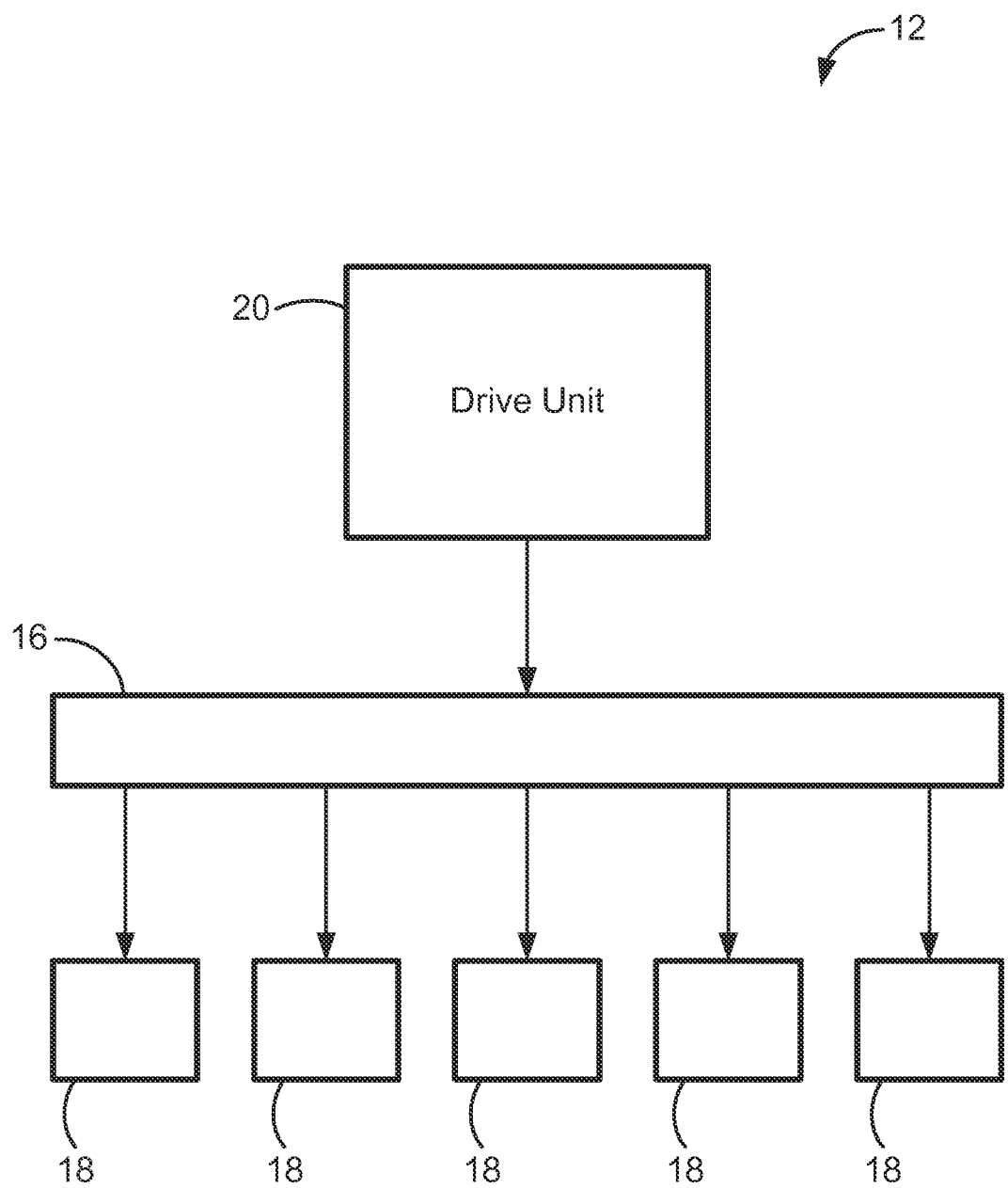
FIG. 3 is a schematic view of a mowing machine.

FIG. 3 illustrates a schematic view of a mowing machine 12. The mowing machine 12 includes a drive unit 22 for driving a rotary cutter bar 16. The rotary cutter bar 16 includes a plurality of mower disc assemblies 18, each containing a plurality of mower blades 20 (see FIG. 2). While the mowing machine 12 is illustrated as including a plurality of mower disc assemblies 18, it is contemplated that as few as one mower disc assembly 18 could be employed in certain applications.

Figure 4:
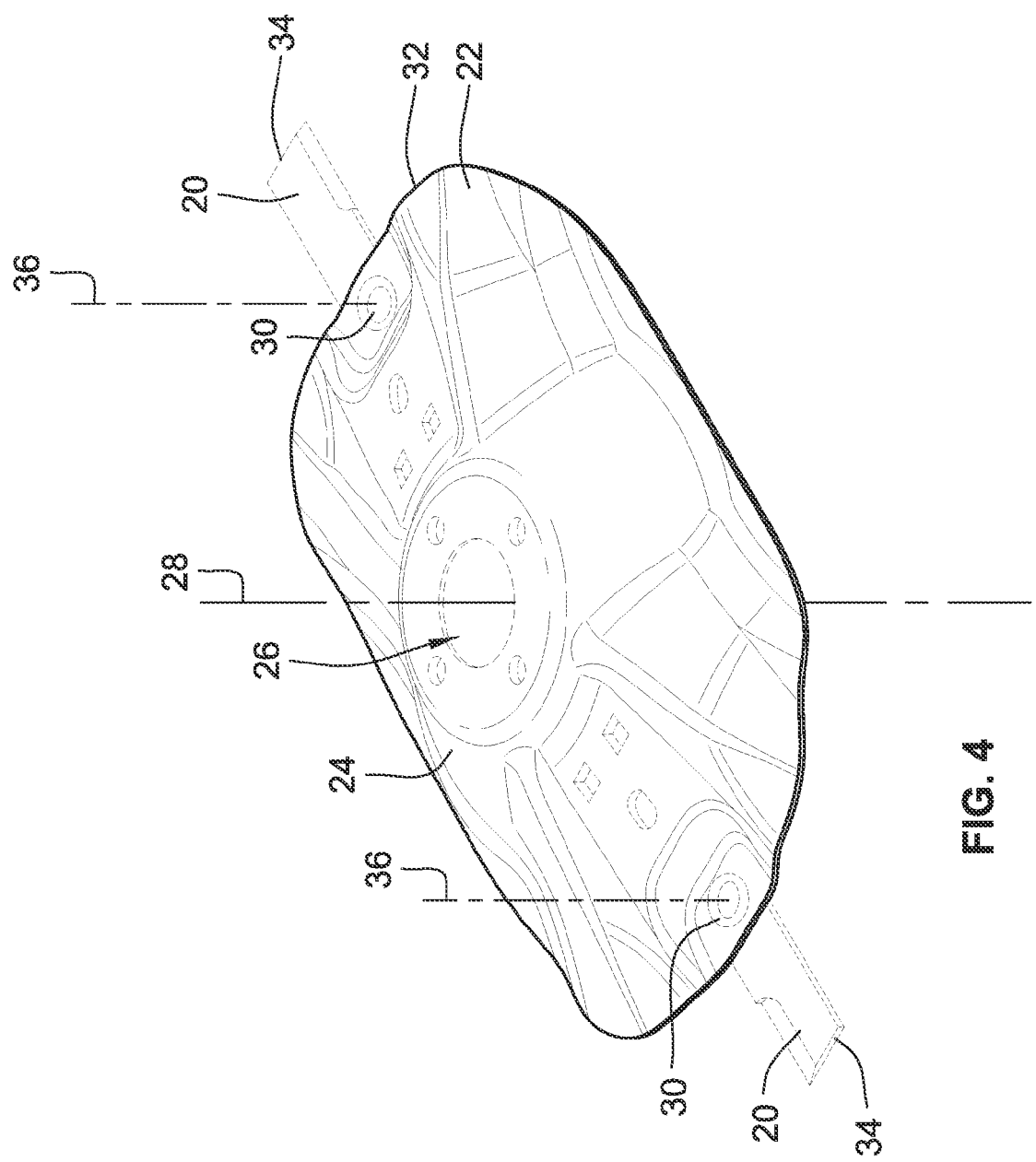
FIG. 4 is an isometric view of a mower disc assembly.

FIG. 4 illustrates an isometric view of a mower disc assembly 18 including disc mower blades 20.

The mower disc assembly 18 includes a mower disc body 24. The mower disc body 24 defines a mounting aperture 26 which attaches to the rotary cutter bar 16 (see FIGS. 2-3) that is in turn driven by the drive unit 22. The drive unit 22 causes the mower disc assembly 18 to rotate about a central axis of rotation 28 that is defined by the mower disc body 24. The mower disc body 24 may include two blade mounting locations 30. In the embodiment shown in FIG. 4 the blade mounting locations 30 are apertures or boss structures through which fasteners (not illustrated) may be inserted to mount blades 20. While two blade mounting locations 30 are illustrated it can be readily appreciated that only a single blade mounting location 30 may be provided on the mower disc body 24 or more than two blade mounting locations 30 may be provide so long as the blade/blades 20 when mounted are balanced during the rotation of the mower disc body 24.

The blades 20 are mounted transversely to the mower disc body 24 central axis of rotation 28. As illustrated, the two blade mounting locations 30 are positioned toward a bottom of the mower disc body 24 so as to balance the blades 20 such that during rotation, the blades 20 will extend outwards beyond a mower disc body 24 outer most periphery 30 under centrifugal force. Each blade 20 comprises a blade body 34 that pivots about a blade body 34 axis of rotation 36. It is not the intent to limit the mounting location structures to apertures or bosses with bolts. Any suitable retainer structure to mount the blade 20 to the mower body 24 may be utilized provided the blade 20 may pivot outwards to extend beyond the mower body 24 outer most periphery 32 under a centrifugal force generated by the mower disc body 24 in rotation.

Turning now to FIGS. 5, 6 and 7, respectively, a top view, bottom view and side view of a blade 20 for a mower disc body 24 are shown. The blade 20 may be stamped formed from sheet steel to include a blade body 34 of a first hardness between HV 400 and 650 on Vickers scale. The blade body 34 has opposed top 38 and bottom 40 surfaces. An outer surface 42 extends around the blade body 34 vertically between the top 38 and bottom 40 surfaces. The blade body 34 includes a mounting aperture 35 that defines the blade body 34 axis of rotation 36. The mounting aperture 35 extends through the top 38 and bottom 40 surfaces.

Blade 20 is depicted in FIG. 4, and describes herein with respect to FIGS. 5, 6, and 7 as having top and bottom surfaces because of the blade's orientation. However, this blade 20 orientation is not intended to be a limiting example of the orientation of blade 20. For example, it can be readily appreciate the blade could be oriented vertically for use in various operations, for example chopping, in which case the blade 20 would be orientated vertically and the top 38 and bottom 40 surfaces would be understood to be opposed surfaces of said vertical blade 20.

A cutting edge 44 extends along the outer surface 42 the blade 20. The cutting edge 44 may extend a length of typically between 10 and 250 millimeters and more preferably between 50 and 100 millimeters. It is not the intent to limit construction of the blade body 34 only to sheet steel. Comparable materials such as cast or machined steel blanks may be utilized to form the blade body 34.

A cutting face 48 is machined, for example by grinding, into the outer surface 42 prior to depositing a plurality of hardened beads 46 onto one of the top 38 or bottom surfaces 40 of the blade 20. The cutting face 46 extends obliquely between the top 38 and bottom surfaces 40 of the blade 20 and comprises the cutting edge 44 where the cutting face 46 intersects either the top 38 or bottom 40 surface depending on the embodiment. For example, in the embodiment, as illustrated here, the cutting edge 44 is formed at the intersection of the bottom surface 40 with the cutting face 46. Moreover, the cutting face 46 extends from the cutting edge 44 along the bottom surface 40 obliquely towards the top surface 38 such that an acute angle 48 is defined between the bottom surface 40 and cutting face 46 of between 45 and 20 degrees. In other words, relative to a blade body central longitudinal axis 50, the cutting face 46 extends radially inward from the bottom surface 40 of the blade 20 towards the top surface 38 of the blade 20.

As the mower disc assembly 18 rotates and is brought into contact with a crop 14 or foliage to be mowed, the cutter blades 20 will impact the crop or foliage 14 at the cutting edge 44 and along the cutting face 46, that is a leading face and thereby cut an upper portion of the crop 14 or foliage from its root system. It is readily understood then that the blade 20 in motion also has a trailing face 47 in opposed space relation to the leading face (e.g. at cutting face 46).

In the embodiment illustrated, the hardened beads 52 are spaced apart from one another and of a second hardness greater than the first hardness. The plurality of hardened beads 52 is deposited on the bottom surface 40, preferably only after the cutting face 46 has either been ground into the blade body 34. In other embodiments the hardened beads 52 may be deposited along the top surface 38. However, here, in the embodiment illustrated the hardened beads 52 are deposited on the bottom surface 40 of the blade 20.

Each one of the hardened beads 52 may be deposited via laser cladding. The laser deposits each of the hardened beads 52 on the bottom surface 40 such that the length of each bead extends from the cutting edge 44 transversely towards the central longitudinal axis of 50 of the blade body 34 at angle 80 of between 45 to 55 degrees relative to the cutting edge. The laser clad beads 52 are space apart from one another so as to define a width 54 at the cutting edge 44.

Accordingly, the cutting edge 44 preferably is defined by exposed discrete segments of the base material of the blade body 34 of a first hardness between each laser clad bead deposit 52 of a second hardness. The laser clad beads are deposited such that an end 68 the laser clad beads 52 by design is at the cutting edge 48 except perhaps for an inconsequential amount that may inadvertently extend slightly past the intended line of demarcation (e.g. due to manufacturing clad process inaccuracies or tolerance issues), that is the cutting edge 44. Such inconsequential and unintended amount of cladding 52 over the cutting edge 44 may be referred to as flash.

Further, it may be that during deposit of the laser cladding 52 intended to meet the cutting edge 44, the end of the laser cladding may inadvertently fall slightly short of the cutting edge 44. This unintended consequence of laser cladding 52 adjacent to the cutting edge 44 still permits the desired configuration, that is a cutting edge 44 that will be comprised of ground base material of a first hardness that wears at a faster rate than the laser clad beads 52 of a second hardness so as to provide for a wave pattern 55 in the cutting edge 44 with use. Thus, preferably, the laser cladding 52 ranges between 0 and 5 mm from edge and more preferably between 0 to 0.5 mm In other words, the wear rate during use, that is the amount of material worn away by use over time, is such that the amount of base material of the softer hardness that is worn away while cutting crop 14 is faster than the wear rate of the laser clad beads 52 of the harder hardness during use. Because the wear rates differ this allows for a wave pattern effect 55 at the cutting edge 44 with cutting teeth created by individual clad beads that may not be sharpened or ground. (FIGS. 8 and 9) This effect provides the benefit of allowing blade 20 to self-sharpen and/or create a wave pattern 55 of spaced cutting teeth on the cutting edge 44.

Accordingly, the laser cladding 52 is deposited on or adjacent but not beyond the cutting edge 44, save for unintended and inconsequentially small amounts. Thus, whether the cladding is at or adjacent the cutting edge 44, the benefit of a longer life cutting edge 44 is provided thereby. Further, cladding in this way provides the cost saving benefit of using less cladding than that of prior efforts that provide cladding beyond the cutting edge. Cladding that extends beyond the blade body 34 to provide a cutting edge requires incurring more cost because of the large amount of required cladding. Further, more expense is required in cladding beyond the blade body because the serration of the cutting edge is only provide for by incurring expensive machining costs in the machining of a serrated edge into the cladding. In an embodiment, more than 50% of the cutting edge 44 is comprised of the base material before and after use. Fewer beads also can be deposited saving time and cost.

Turning briefly then to FIGS. 8 and 9, the angle 80 at which the laser clad beads 52 are deposited relative to the cutting edge 44 and the width 54 between the laser clad beads 52 can provide additional benefit with potential sliding action during cutting. It is preferably angled radially outwardly as the bead 52 extends from the leading face 46 to the trailing face end 47.

As the blade 20 is used to cut a crop 14 the wear and wave patterns 55 of the cutting edge 44 occurs and a wave pattern 55 is formed along the cutting edge 44. Each crest 56 of each wave in the wave pattern 55 along the cutting edge 44 is made up of the laser clad material 52 of the second hardness while each wave trough 58 is made up of the base material of the blade body 34 of the first hardness.

In some embodiments, the beads 52 are deposited at 90 degrees.

In another embodiment, if the laser clad beads 52 are deposited such that they extend perpendicular to the cutting edge 44, the wave pattern effect may be too severe along the cutting edge 44 such that the depth 78 of the troughs 58 into the base material is too severe. The depth 78 of the trough 58 is the distance from the cladding end 68 inwards toward the outermost periphery 32 of the blade body 36 of the first material. The severity in depth 78 is the result of a wear rate of the base material that is too fast relative to that of the laser clad beads 52 of the second material. As such, too much of the base material wears away too quickly which in turn produces pre-mature breaking of the cutting edge 44 and the entire blade body 34.

To avoid this effect, the angle 80 at which each laser clad bead 52 is deposited relative to the cutting edge 44 is controlled as is the width 54 between each bead 52. This control of the angle 80 and width 54 is provided, as previously discussed, by depositing each laser clad bead 52 so as to extend from the cutting edge 44 transversely towards the central longitudinal axis of 50 of the blade body 34 at angle 80 of between 45 to 55 degrees relative to the cutting edge 44.

Further, the laser clad beads 52 are space apart from one another so as to define a width 54 at the cutting edge 44. Typically, the width 54 between the laser clad beads 52 is between 0.5 and 5 mm. This distance functions to create a wear pattern of several teeth spaced to both limit wear and cut in a wave pattern with teeth.

Turning back to FIGS. 5-7, the cutting edge 44 typically has a length 60 of between 7.5 and 20 cm. The blade 20 itself typically has a blade length 64 of between 1.5 and 15 cm. Further, a material thickness 66 of the blade 20, that is the width between the top surface 38 of the blade 20 and the bottom surface 40 of the blade 20, is substantially uniform and typically between 2 and 15 mm. In a preferred embodiment the blade length 64 is 10 cm and the cutting edge 44 length is 7.5 cm, and the material thickness 66 of the blade 20 is 5 mm. Thereby, the blade 20 dimensions make it particularly adapted for use as a mower blade.

As illustrated, the cutting edge 44 extends along a full length 60 of the cutting face 46. The laser clad beads 52 do not extend along the full length 60 of the cutting edge 44. That is, a length 62 at an end of the cutting edge 44 and along the cutting face 46 is free of any laser cladding before and after use. In an embodiment, prior to use and after use 50 percent of the cutting edge 44 is free of the laser clad beads 52. Further, over 80 percent of the bottom surface 40 is free of cladding.

Also, as illustrated, the beads 52 have a tapered profile 63 along the bottom surface 40 of the blade 20. That is, the length of each extension of laser clad bead 52 increases from the innermost area along the cutting face 46 towards an outermost end 86 of the cutting face 46 at least until the plurality of beads 52 reaches the outermost end 86 where the laser clad bead 52 length again decreases within the limits defined by the outermost end 86 and the cutting edge 44.

The length of the laser clad bead 52 is readily understood to mean the distance from at or adjacent the cutting edge 44 to a terminal end of the clad bead as it extends towards the central longitudinal axis 50 and the trailing face 47 of the blade 20. The tapered profile 63 provides for increased strength of that part of the blade 20 at the cutting face 46 and extending in the tapered profile along the bottom surface 38. Thus, the laser clad beads 52 in the tapered profile 63 prevent wear and breakage of the blade 20 while minimizing the amount of laser clad material through a very targeted and limited deposits along the bottom surface 38.

The hardened beads 52 have a width 70 between 0.5 and 20 mm. The hardened beads 52 have a depth 72 and are 10 to 30 percent of the material thickness 66. The steel material hardness of the blade body 34 is between HV 400 and 650 in the Vickers Hardness Scale. The hardened beads 52 are harder in comparison to the steel blade body 34 material and can comprise at least one of the materials comprising tungsten carbide, chrome carbide, iron carbide, ceramic and other material having a Vickers Hardness Scale hardness between HV 700 to 1400.

Turning now to FIG. 10, an embodiment of blade 20 is illustrated. The embodiment is similar in every respect to that blade 20 which has been heretofore described except that in this embodiment blade 20 includes a second plurality of hardened beads 82 deposited, as with the first plurality of hardened beads 52, only after the cutting face has been machined. As with the first plurality of hardened beads 52, the second plurality of hardened beads 82 are preferably not machined or sharpened. Moreover, all the characteristic of the material comprising the second plurality of beads 82, for example, its thickness 72 and width 70 of deposits are the same as that which has been described with respect to the first plurality of hardened beads 52. As can be seen in the illustration, the second plurality of hardened beads 82 provides an additional backing to the bottom surface 40 are deposited so as to produce a crisscross pattern with the first plurality of hardened beads 52 along the bottom surface 38.

In this embodiment blade 20 has a radial end 84 in opposed space relation to an outermost end 86 of the blade 20. The second plurality of hardened beads 82 includes an outermost end portion 88 and a cutting edge portion 90. Each one of the extensions of the hardened bead portions 88, 90 is deposited so as to be spaced apart from another one of the extensions the hardened bead portions 88, 90 to define a width 54 between each one of the extensions of the hardened bead portions 88, 90 along cutting edge 44 and outermost end 86. Additionally, each one of the extensions of the second plurality of hardened beads 82 is deposited so as to be spaced apart from one of the extensions of the first plurality of hardened beads 52 so as to define and keep the same width 54 between them.

Each one of the hardened bead extensions of the cutting edge portion 90, like each one of the extensions of the first plurality of hardened beads 52, extends from a bead end 68 at or adjacent the cutting edge 44. Each one of the bead extensions of the cutting edge portion 90 is deposited so as to be approximately perpendicular in relation to one of the hardened bead extensions of the first plurality of hardened beads 52 and thus provide for the crisscross pattern of the first and second bead pluralities.

Each one of the extensions of the cutting edge portion 90 extends towards the central longitudinal axis 50 of blade 20 and towards the radial end 86 of blade 20. In other words, whereas each one of the hardened bead extensions of the first plurality of hardened beads 52 have an angle 80 of between 45 and 55 degrees as measured relative to the cutting edge 44, here, the angle 81 of each extension of the cutting edge portion 90 is between 135 and 145 degrees relative to the cutting edge 44.

Each one of the extensions of the outermost end portion 88 extends from along from at or adjacent the outermost end 86 towards the central longitudinal axis 50 at an angle 83 of between 45 to 55 degrees relative to the outermost end 86.

Accordingly, like blade 20, here the angles 80, 81 at which the first 52 and second 82 plurality of hardened beads are deposited relative to the cutting edge 44 and the width 54 between each one of the extensions of cutting edge portion 90 determines the degree of wear/wear pattern 55 that will occur during use. The second plurality of hardened beads 82 provides the advantage of reinforcing the bottom surface 40 and in particularly the outermost end 86 of the blade 20 so as to prevent premature wear of the blade 20 including breaks in the blade 121.

Turning to FIG. 11, as the blade 20 of the embodiment just described, that is the one with the first and second pluralities of hardened beads 52, 82 is used to cut a crop 14 the same wave pattern 55 and thus self-sharpening of the cutting edge 44 that occurs with blade 20 of a single plurality of hardened beads 52 occurs.

Figure 12:
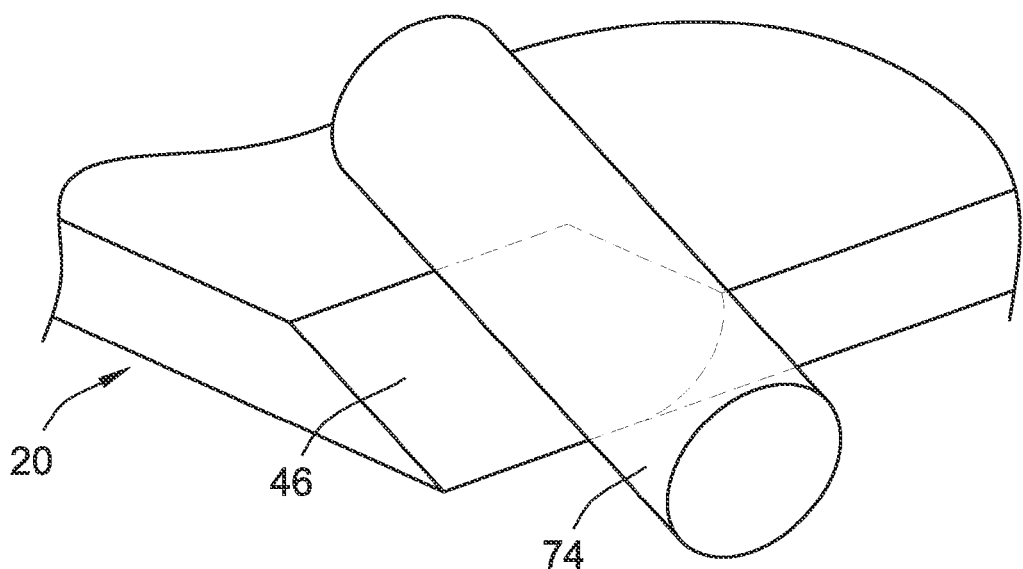
FIG. 12 is a schematic illustration of machining a cutting face according to an embodiment of the present invention.
Figure 13:
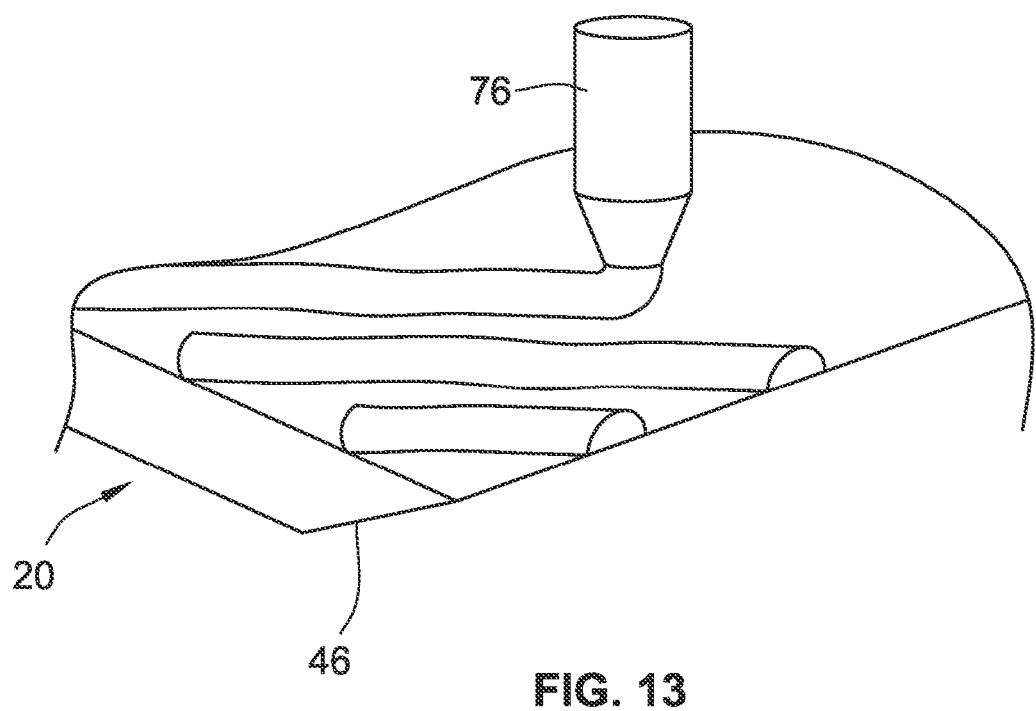
FIG. 13 is a schematic illustration of laser cladding a cutting blade according to an embodiment of the present invention.

As has been discussed the invention provides for a method that includes the step of grinding and or otherwise machining the cutting face 46 with a machine 74, as illustrated in FIG. 12, or forming the cutting face 46 (not illustrated) into the blade body 36 prior to the step of cladding hardened beads 52 via a laser clad machine 76 onto the bottom surface 40 of the blade body 36, as illustrated in FIG. 13. The laser clad beads 52 are not machined and or ground before use.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cutting blade for vegetation comprising:
a cutting blade body comprising a first base material, the cutting blade body comprising:
top and bottom surfaces,
an outer surface extending around the cutting blade body vertically between the top and bottom surfaces;
a cutting edge along formed along the outer surface; and
a plurality of clad beads extending along one of the top and bottom surfaces transversely away from the cutting edge, wherein the cutting edge is non-serrated.

2. The cutting blade of claim 1, wherein the cutting edge along a ground face is formed by the first base material in an unused condition and, wherein the cutting blade is configured such that the plurality of clad beads are at the cutting edge in the unused condition are sufficiently adjacent to the cutting edge such that the plurality of clad beads become part of the cutting edge over time during use.

3. The cutting blade of claim 1, wherein the first base material is of a first hardness having a first wear rate with use, and wherein the plurality of clad beads are of a second material of a second hardness having a second wear rate with use.

4. The cutting blade of claim 3, wherein the first hardness is less than the second hardness and wherein the first wear rate of the first material is greater than the second wear rate of the second material.

5. The cutting blade of claim 4, wherein the plurality of clad beads is laser clad beads deposited on one of the top and bottom surfaces.

6. The cutting blade of claim 3, wherein each one of the plurality of clad beads is spaced laterally from another one of the plurality of clad beads with unclad regions therebetween such that the base material of the first wear rate between each one of the plurality of clad beads of the second wear rate wears faster during use resulting in a wave pattern in the cutting edge.

7. The cutting blade of claim 1, wherein no part of the plurality of clad beads, other than flash, extends forward of the cutting edge in the unused condition, a leading end of the clad beads being between 0 mm and 5 mm of the cutting edge.

8. The cutting blade of claim 1, wherein the blade includes a clad bead application region, the clad beads occupying 20% to 80% of the clad bead application region and free regions of first base material exposed between the clad beads comprising 20% to 80% of the clad bead application region.

9. The cutting blade of claim 6, wherein the space between the each one of the plurality of clad beads adjacent to the cutting edge is between 0.5 mm and 20 mm to control depth of the wave pattern during wear.

10. The cutting blade of claim 6, wherein each one of the plurality of clad beads extends transversely away from the cutting edge towards a central longitudinal axis of the cutting blade body at an angle in the range of 45° to 55° relative to the cutting edge.

11. The cutting blade of claim 1, wherein the plurality of clad beads comprise a first plurality of clad beads and a second plurality of clad beads, the first plurality aligned differently than the second plurality.

12. The cutting blade of claim 11, wherein the first and second plurality overlap in a crisscross pattern.

13. The cutting blade of claim 1, wherein the cutting blade is non-serrated.

14. The cutting blade of claim 1, wherein the cutting face is formed along a beveled surface of the cutting blade with no portion of the beveled surface extending through the clad beads.

15. The cutting blade of claim 1, wherein the cutting edge is at forward-most location of the cutting blade with the clad beads positioned behind the forward-most location.

16. The cutting blade of claim 1, wherein the first base material is sharpened along an oblique cutting face to create the non-serrated cutting edge and no portion of the beads are sharpened.

17. A mower disc assembly, comprising at least two of said cutting blade of claim 1, the mower disc assembly comprising:
a mower disc body adapted to rotate about a central axis of the mower disc body;
each cutting blade mounted to the disc mower body in space relation; each cutting blade further comprising:
a leading face and trailing face relative to the mower disc body in rotation about the central axis;
the cutting edge along the leading face; and
wherein the plurality of clad beads extend from the leading face at or adjacent the cutting edge towards the trailing face.

18. A cutting blade for a mower disc body, the blade comprising:
a cutting blade body comprising a base material of a first hardness, the blade body having opposed top and bottom surfaces and comprising an outer surface extending around the blade body vertically between the top and bottom surfaces;
a cutting blade body mounting aperture extending through the top and bottom surfaces;
a cutting face extending obliquely between the top surface toward the bottom surface;
a cutting edge formed at a leading edge of the cutting face; and
wherein one of the top and the bottom surfaces comprises a plurality of hardened beads spaced apart and of a second hardness greater than the first hardness, the hardened beads arranged at or adjacent to the cutting edge, wherein lateral gaps are formed of the base material between each one of the plurality of hardened beads that are adjacent.

19. The cutting blade of claim 18, wherein the cutting edge is configured to become serrated only after use.

20. The cutting blade of claim 19, wherein the plurality of hardened beads are deposited along the cutting edge and thereby form part of the cutting edge of the cutting face and are not machined prior to use.

21. The cutting blade of claim 20, wherein the plurality of hardened beads do not extend beyond an outermost perimeter of the blade body prior to use, other than flash.

22. The cutting blade of claim 21, wherein the first and second hardness and materials of hardened beads and the base material are different such that the hardened regions wear slower such that during cutting use the plurality of hardened beads extend beyond the outermost periphery of the blade body to form part of a wave pattern along the cutting edge only after use.

23. The cutting blade of claim 18, wherein the cutting edge is composed of discrete cutting edge segments; each one of the cutting edge segments comprised of at least an unsharpened end of the plurality of hardened beads and a length of base material.

24. The cutting blade of claim 18, at least 20% of the cutting edge is comprised of the base material before and after use.

25. The cutting blade of claim 18, wherein the cutting blade is non-serrated.

26. The cutting blade of claim 18, wherein the cutting edge is at forward-most location of the cutting blade with the clad beads positioned behind the forward-most location.

27. A mower disc assembly, comprising at least two of said cutting blade of claim 18, the mower disc assembly comprising:
a mower disc body adapted to rotate about a central axis of the mower disc body;
each cutting blade mounted to the disc mower body in space relation; each cutting blade further comprising:
a leading face and trailing face relative to the mower disc body in rotation about the central axis;
the cutting edge along the leading face; and
wherein the plurality of clad beads extend from the leading face at or adjacent the cutting edge towards the trailing face.

28. A method comprising:
providing a cutting blade with a cutting blade body having a top surface and a bottom surface; the cutting blade body being formed of a base material, a cutting edge formed into the cutting blade body; the cutting edge extending along an outer edge of the cutting blade body; and
cladding a plurality of beads laterally spaced apart along one of the top and bottom surfaces so that the plurality of beads extend from the cutting edge towards a central longitudinal axis of the cutting blade while leaving exposed regions of the base material between each one of the plurality of laterally spaced beads that are adjacent.

29. The method of claim 28, wherein the step of cladding further comprises the step of depositing each one of the plurality of beads transversely away from the cutting edge towards the central longitudinal axis of the cutting blade body at an angle in the range of 45° to 55° relative to the cutting edge.

30. The method of claim 28, wherein the step of providing the cutting blade with the cutting blade body includes providing the top and bottom surfaces in opposed space relation and a cutting face that extends from the cutting edge towards a one of the top and bottom surfaces.

31. The method of claim 30, wherein the step of cladding is done only after the cutting face is formed.

32. The method of claim 31, wherein the step of cladding is done by laser cladding.

33. The method of claim 31, wherein the base material is of a first hardness, the cladding is of a second material of a second hardness; and
    wherein the first hardness is less than the second hardness such that during use the base material wears faster than the second material so as to form a wave pattern in the cutting edge.

34. The method of claim 28, wherein the cutting blade is non-serrated.

35. The method of claim 28, wherein the cutting edge is at forward-most location of the cutting blade with the clad beads positioned behind the forward-most location.

\* \* \* \* \*